March 14, 1972  H. Z. MARTIN  3,649,521
FLUID CATALYTIC CRACKING PROCESS EMPLOYING CONVENTIONAL
CRACKING CATALYST AND SUPERACTIVE MOLECULAR
SIEVE CRACKING CATALYST
Filed Sept. 19, 1969
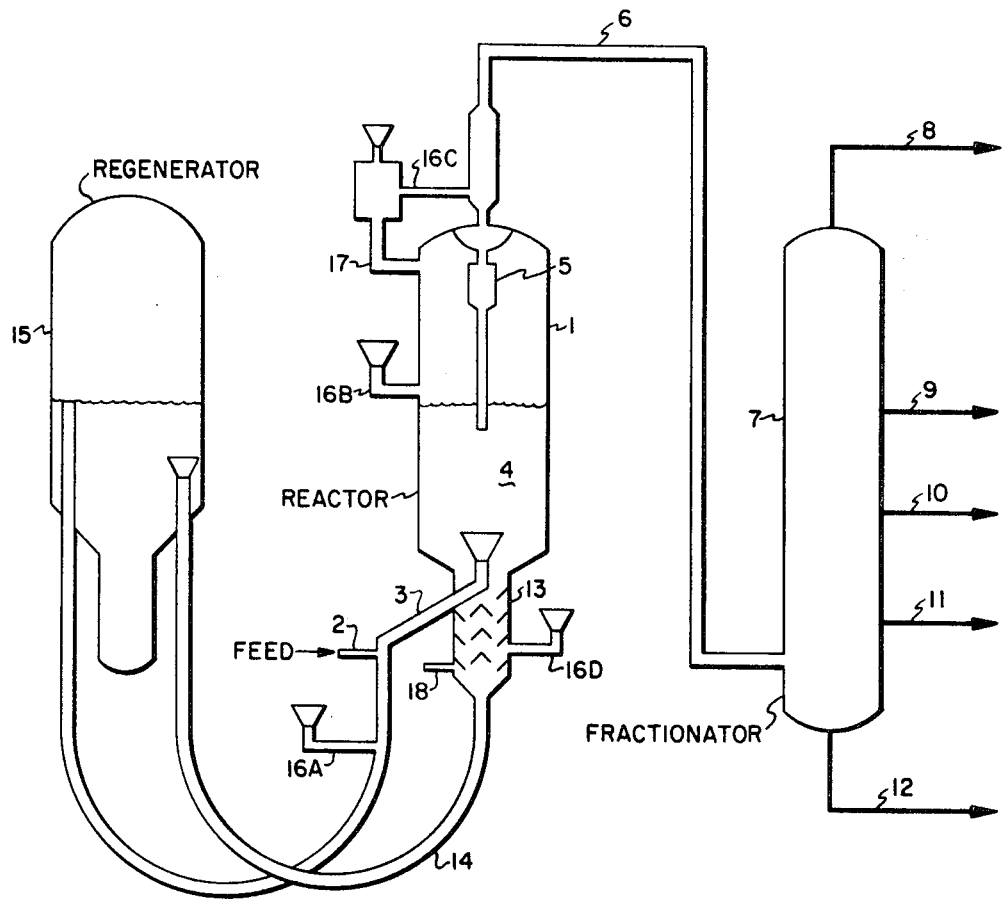
Homer Z. Martin  INVENTOR
BY  C. W. Crady  ATTORNEY United States Patent Office
3,649,521
Patented Mar. 14, 1972

3,649,521
FLUID CATALYTIC CRACKING PROCESS EMPLOYING CONVENTIONAL CRACKING CATALYST AND SUPERACTIVE MOLECULAR SIEVE CRACKING CATALYST
Homer Z. Martin, Westfield, N.J., assignor to Esso Research and Engineering Company, Linden, N.J.
Filed Sept. 19, 1969, Ser. No. 859,279
Int. Cl. C10g 37/02, 11/18
U.S. Cl. 208—120
13 Claims

ABSTRACT OF THE DISCLOSURE

Conversion of a petroleum hydrocarbon fraction in a fluid catalytic cracking process utilizing a conventional amorphous fluid cracking catalyst or a conventional crystalline aluminosilicate zeolite fluid cracking catalyst is increased by contacting at least a vapor portion of the fraction with a catalyst comprising a pure superactive crystalline aluminosilicate zeolite material having a particle size of less than about 10 microns.

Fluid catalytic cracking units provide a major source of gasoline and other fuels. Since most units are at least several years old, conversion of cracking feed to fuels is limited by the equipment design and configuration of the unit. The performance of many units has been improved recently by the use of zeolite fluid cracking catalysts.

The dense bed fluid cracking process provides flexibility in variation of reactor holdup, temperature and catalyst circulation rate to permit adjustments in accordance with changing refinery requirements. However, an added requirement of changing product objectives, e.g., maximizing naphtha, maximizing heating oil, providing light ends for petrochemicals and for alkylation as well as seasonal fluctuation of product demand leads to a desire for increased flexibility in the fluid catalytic cracking process. Therefore, it is an object of this invention to meet changing product objectives and to greatly increase the flexibility of the fluid catalytic cracking process.

The present invention provides a means of augmenting or varying conversion in an existing fluid catalytic cracking unit with minimum capital expenditure. The process of the invention is applicable to grass roots cracking units as well as existing units.

Briefly stated, the invention comprises a process of carrying out fluid catalytic cracking in the presence of two cracking catalysts, e.g., conventional fluid cracking catalyst and pure unencapsulated crystalline aluminosilicate molecular sieve cracking catalyst. Further details of the invention are set forth below. The drawing is a flow sheet disclosing a preferred embodiment of the invention.

As it is used in this specification, the term conventional cracking catalyst means amorphous silica-type cracking catalyst as well as the newer crystalline aluminosilicate zeolites which are physically combined or encapsulated with amorphous catalyst, with clays or with some other host material to provide a fluidizable catalyst particle.

Amorphous silica-alumina, silica-magnesia and silica-zirconia fluid cracking catalysts have been in commercial use for twenty-five years. In general they are prepared by (1) coprecipitation or cogelation of silica and alumina from mixed solutions of sodium silicate and aluminum sulfate, or (2) formation of silica hydrogel by reaction of sodium silicate with sulfuric acid, followed by incorporation of alumina, for example by addition of aluminum sulfate and ammonia. The composite is then water-washed and dried. Commercial amorphous silica-alumina fluid cracking catalysts have an average particle size in the range of 70 to 80 microns.

Cracking clays have also been in use for over twenty-five years. Naturally occurring clays such as bentonite, kaolin and halloysite are chemically treated to render them active for catalytic cracking. They are then shaped into particles suitable for fluidization and circulation in a fluid cracking unit.

Numerous preparations of typical conventional silica-alumina and clay cracking catalysts are described by Ryland et al., Catalysis, vol. VII, 1960, pp. 1–86, and by references cited therein.

The improved process of the invention also applies to fluid cracking processes utilizing molecular sieve fluid cracking catalysts. Because of the extremely small size and high activity of sieves, they are not used in the pure form in regenerative dense bed fluid catalytic cracking processes. They are employed in a matrix or encapsulated with amorphous silica-alumina catalyst and/or clay. In this form the zeolite-containing catalyst is in the form of a fluidizable particle and it can be controlled in cracking activity. Additional problems such as attrition and carry over from the reactor and/or regenerator are mitigated.

In general the chemical formula of the anhydrous crystalline aluminosilicate zeolite, employed in the present invention, expressed in terms of moles may be represented as:

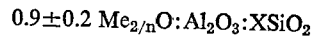

$$0.9 \pm 0.2\ Me_{2/n}O : Al_2O_3 : XSiO_2$$

wherein Me is selected from the group consisting of metal cations, hydrogen, and ammonia, $n$ is its valence and X is a number above 3, e.g., 4 to 14, preferably 4.5 to 6.5. The crystalline aluminosilicate zeolites include synthetic crystalline aluminosilicates, naturally occurring crystalline aluminosilicates and caustic treated aged clays in which a portion of the clay has been converted to crystalline zeolite. Synthetic materials include faujasites and mordenites. Natural materials are erionite, analcite, faujasite, phillipsite, clinoptilolite, chabazite, gmelinite, mordenite and mixtures thereof. Montmorillonite and kaolin clays can be treated to obtain crystalline aluminosilicates.

All or a portion of the cations of the zeolites such as sodium cations can be replaced with hydrogen ions, ammonium ions or metal cations such as rare earth, manganese, cobalt, zinc and other metals of Groups I to VIII of the Periodic Table.

Preparations of matrix type fluid cracking catalysts are disclosed in U.S. Pat. No. 3,329,628, U.S. Pat. No. 3,352,796, U.S. Pat. No. 3,410,808, and U.S. Pat. No. 3,140,249. In this type of catalyst the zeolite crystals are coated with or encapsulated in a siliceous gel. The matrix type catalyst contains 5 to 50%, preferably 5 to 20%, crystalline zeolite.

Certain natural clay minerals can be treated to convert a portion of the material to crystalline zeolite. Clays such as kaolin, kaolinite, halloysite, bentonite and other siliceous clays have been treated in this manner as disclosed in U.S. Pat. No. 3,037,843, U.S. Pat. No. 3,065,054, and U.S. Pat. No. 3,458,454, for example. The treated clays contain 5 to 50% crystalline zeolite.

Any conventional zeolite type fluid cracking catalyst containing 5 to 50% zeolite and having an average particle size of more than about 50 microns can be used as the first or principal fluid cracking catalyst in the process of the invention. The auxiliary or second catalyst is a substantially pure unencapsulated crystalline zeolite containing 70 to 100% crystalline zeolite and it has an average particle size of less than 10 microns, preferably less than 5 microns. The most preferred particle size is in the range of .1 to 2 microns. The pure zeolite is used in very small amounts in the process to augment the cracking effected by the fluid conventional catalyst. In the preferred embodiment the pure sieve catalyst is used on a once-through basis and no attempt is made to recover and regenerate the pure zeolite catalyst.

Referring to the drawing, reference numeral 1 refers to a single stage fluid catalytic cracking reactor. In this type of reactor a major amount of cracking takes place in the dense bed and lesser amounts of conversion take place in the reactor feed line, in the dilute phase above the dense bed and in the stripper. In conventional operation a petroleum hydrocarbon is fed by line 2 into line 3 for admixture with regenerated fluid cracking catalyst. Suitable process feeds include fractions boiling in the range of 200° to 1200° F. derived from atmospheric distillation, deasphalting, vacuum distillation, coking, visbreaking, solvent extraction, mixed fractions, etc. The feed can contain recycle stock. The oil fed to the process is usually heated to a suitable temperature in the range of 300° to 900° F. and it preferably passes through line 3 in the vapor phase or in mixed phase wherein the major proportion of the feed, i.e., 60 to 99%, is in the vapor phase. The catalyst to oil ratio is in the range of 2/1 to 15/1.

The feed is cracked in a dense fluidized bed 4 at a temperature in the range of 700° to 1050° F., preferably 850° to 950° F. Pressure ranges from 1 to 50 p.s.i.g. Conversion to gasoline ranges from 40 to 80%. The conventional fluid catalyst is separated from cracking effluent by cyclone 5 with the fluid catalyst returning to the dense bed and the cracked products and unconverted material passing overhead by line 6. The cracked products are separated in fractionation column 7. A gas and gasoline fraction is recovered by line 8. A kerosene and jet fuel fraction is recovered by line 9. Heating oil fractions and cycle oil fractions are recovered by line 10 and 11, respectively. A bottoms fraction is recovered by line 12.

Conventional fluid catalyst requiring regeneration is passed through stripper 13 and line 14 to regenerator 15. The catalyst is regenerated by conventional fluid contacting means and returned to the reactor by line 3.

The pure, unencapsulated and undiluted molecular sieve catalyst can be added to the fluid catalystic cracking process at one or more suitable points in the system. In one embodiment the pure catalyst is added to line 3 by line 16a. The advantage of this point of addition is that the pure catalyst is rapidly mixed with hot regenerated conventional fluid catalyst under conditions of good heat transfer so that the added catalyst will be heated to the same temperature as the fluid catalyst prior to contacting the feed. Another advantage of this point of addition is that fresh virgin feed is contacted with fresh uncontaminated catalyst. The pure catalyst will react with oil feed as soon as it contacts the feed in line 3. Because the pure catalyst is so much smaller in particle size than the conventional fluid catalyst, it will pass through the fluid cracking reactor into line 6. If it is deemed desirable to keep the pure sieve catalyst out of contact with fluid bed 4, the catalyst can be added to the dilute phase of the fluid reactor by line 16b. A plurality of input lines spaced around the circumference of the reactor can be used to obtain good dispersion of the catalyst. In a further embodiment the pure catalyst is added to the cracked vapors passing from the reactor to the fractionator via line 6. The catalyst is added by line 16c and if desired hot vapor recovered by line 17 from the reactor can be used as a carrier medium for the catalyst. In a still further embodiment the pure catalyst is added to the stripper 13 by line 16d. The pure catalyst passes upward through the stripper under the driving force of stripping gas added to the stripper by line 18. The pure zeolite catalyst can be added to the fluid cracking system by any combination of lines 16a, 16b, 16c and 16d.

The location of the pure catalyst input line depends upon the type of fluid cracking unit, the characteristics of the feed (including recycle) and the type of product slate desired. Due to seasonal requirements such as maximum gasoline in the summer and maximum heating oil in the winter it may be desirable to use one input location at one period of the year and another location at another period of the year. It may also be advantageous to add the pure zeolite catalyst intermittently in accordance with seasonal product demand. The ratio of pure catalyst to oil will be in the range of .1 to 1 to .001 to 1; thus, it is apparent that a very small quantity of pure catalyst is used.

Since the quantity and particle size of the pure zeolite catalyst is very small, most of this material will pass through the cyclones 5 and line 6 into fractionator 7. The lower portion of the fractionator comprises a stripping section and most of the catalyst is stripped into the heavier fractions. If desired, the catalyst can be removed from any of the product fractions by suitable separation means.

EXAMPLE

As a specific example of a fluid catalytic cracking process of the present invention, the following details are given for a unit charging 10M $B/D$ of fresh gas oil. About 5 to 10 tons per minute of conventional regenerated amorphous-silica alumina catalyst containing 13% alumina are mixed with the feed in line 3. About 15 to 25 lb./min. of rare earth exchanged synthetic faujasite is added to line 3 by line 16a. The conventional catalyst in line 3 has 70% of particles in the range of 40 to 80 microns. The pure zeolite catalyst has 90% of particles in the range of 0 to 10 microns. The holdup of conventional catalyst in dense bed 4 is 1 to 4 minutes. The holdup of pure zeolite catalyst is less than 10 seconds. When the zeolite catalyst is added, conversion of the gas oil will be increased.

The process of the present invention is applicable to all types of fluid cracking systems that are characterized by a dense bed of fluidized catalyst. Typical dense beds have a catalyst density of 10 to 35 lb./cu. ft. Systems in which the reactor is located over the regenerator and systems in which the reactor and the regenerator are enclosed within a single shell are included within the scope of the invention.

The process is attractive from a cost standpoint because a very small amount of catalyst is used to improve the operation of the fluid cracking unit. Only minor structural alteration of the unit is required to provide means for addition of the pure zeolite catalyst regardless of the type and age of the fluid cat cracker. Feed conversion will be increased with a negligible or very modest increase in the burning function of the regenerator.

What is claimed is

1. A process for cracking a petroleum hydrocarbon fraction comprising contacting said fraction at cracking conditions in a fluidized cracking system with fluid cracking catalyst having an average particle size of at least 40 microns and augmenting the cracking of said fluidized cracking system by initially contacting a second catalyst consisting essentially of a substantially pure unencapsulated crystalline aluminsilicate zeolite material having an average particle size of less than 10 microns with a vapor phase portion of said hydrocarbon fraction.

2. Process according to claim 1 in which the second catalyst has an average particle size in the range of .1 to 2 microns.

3. Process according to claim 1 in which the fluid catalyst comprises 5 to 40% of a rare earth exchanged faujasite in a matrix.

4. Process according to claim 1 in which the fluid catalyst is an aluminosilicate cracking clay containing 5 to 40% of crystalline aluminosilicate zeolite.

5. Process according to claim 1 in which the second catalyst is a crystalline aluminosilicate zeolite material which has been ion exchanged so that it contains cations selected from the group consisting of hydrogen, ammonium, rare earth metals, magnesium, calcium, aluminum, zinc, platinum and palladium.

6. Process according to claim 1 in which the second catalyst comprises a crystalline aluminosilicate molecular sieve zeolite material recovered from a naturally occurring deposit.

7. The process of claim 1 wherein said fluidized cracking catalyst is selected from the group consisting of amorphous cracking catalyst, a crystalline aluminosilicate zeolite incorporated in a matrix, a crystalline aluminosilicate zeolite physically combined with amorphous catalyst, and crystalline aluminosilicate zeolite physically combined with clay.

8. A process for cracking a petroleum hydrocarbon fraction comprising contacting said fraction at cracking conditions in a fluidized cracking system including (a) a reactor containing a dense bed of catalyst and (b) catalyst regeneration means, with fluid cracking catalyst having an average particle size of at least 40 microns, and augmenting the cracking in said fluidized cracking zone by mixing and heat integrating a second catalyst, consisting essentially of a substantially pure unencapsulated crystalline aluminosilicate zeolite material having an average particle size of less than 10 microns, with regenerated fluid cracking catayst thereby forming a catalyst mixture and, thereafter, initially contacting the catalyst mixture with a vapor phase portion of said hydrocarbon fraction.

9. A process for cracking a petroleum hydrocarbon fraction comprising contacting said fraction at cracking conditions with a fluid cracking catalyst having an average particle size of at least 40 microns, where said cracking is conducted in a fluidized cracking system including a reactor containing a dense bed of fluid cracking catalyst, a dilute catalyst phase containing a vaporous mixture comprising an unreacted hydrocarbon fraction and a cracked hydrocarbon fraction, and augmenting the cracking in said fluidized cracking system by initially contacting a second catalyst, consisting essentially of a substantially pure unencapsulated crystalline aluminosilicate zeolite material having an average particle size of less than 10 microns, with said vaporous mixture in said dilute phase of said fluidized cracking zone.

10. A process for cracking a petroleum hydrocarbon fraction comprising contacting said fraction at cracking conditions with a fluid cracking catalyst having an average particle size of at least 40 microns, wherein said cracking is conducted in a fluidized cracking system including a reactor containing a dense bed of fluid cracking catalyst, a dilute catalyst phase containing a vaporous mixture comprising an unreacted hydrocarbon fraction and a cracked hydrocarbon fraction, and augmenting the cracking in said fluidized cracking system by initially contacting a second catalyst, consisting essentially of a substantially pure unencapsulated crystalline aluminosilicate zeolite material having an average particle size of less than 10 microns, with at least a portion of said vaporous mixture exiting from said dilute phase of said reactor.

11. A process for cracking a petroleum hydrocarbon fraction comprising contacting said fraction at cracking conditions with a fluid cracking catalyst having an average particle size of at least 40 microns, where said cracking is conducted in a fluidized cracking system including a reactor comprising a dense bed of fluid cracking catalyst, a dilute catalyst phase, a stripper section, and augmenting the cracking in said fluidized cracking system by initially contacting a second catalyst, consisting essentially of a substantially pure unencapsulated crystalline aluminosilicate zeolite material having an average particle size of less than 10 microns, with at least a portion of said hydrocarbon fraction in the vapor phase, said initial contacting being conducted in the stripper section of said fluidized cracking zone.

12. A process for cracking a petroleum hydrocarbon fraction comprising contacting said fraction at cracking conditions in a fluidiized cracking system including a reactor containing a dense bed of a fluid cracking catalyst having an average particle size of at least 40 microns and augmenting the cracking in said fluidized cracking system by initially contacting a second catalyst consisting essentially of a substantially pure unencapsulated crystalline aluminsilicate zeolite material having an average particle size of less than about 10 microns with said hydrocarbon fraction where said contacting takes place subsequent to the entry of said hydrocarbon fraction into the reactor of said fluidized cracking system.

13. The process of claim 12 wherein said fluidized cracking catalyst is selected from the group consisting of amorphous cracking catalyst, crystalline aluminosilicate zeolite incorporated in a matrix, crystalline aluminosilicate zeolite physically combined wth amorphous catalyst and crystalline aluminosilicate zeolite physically combined with clay.

References Cited

UNITED STATES PATENTS

| 3,368,981 | 3/1968 | Plank et al. | 208—120 |
| 3,140,253 | 7/1964 | Plank et al. | 208—120 |
| 3,380,911 | 4/1968 | Owen | 208—74 |

DELBERT E. GANTZ, Primary Examiner

U.S. Cl. X.R.

208—74